Feb. 27, 1968 J. W. VON BRIMER 3,370,639
DRAPERY ACTUATOR
Original Filed May 1, 1964
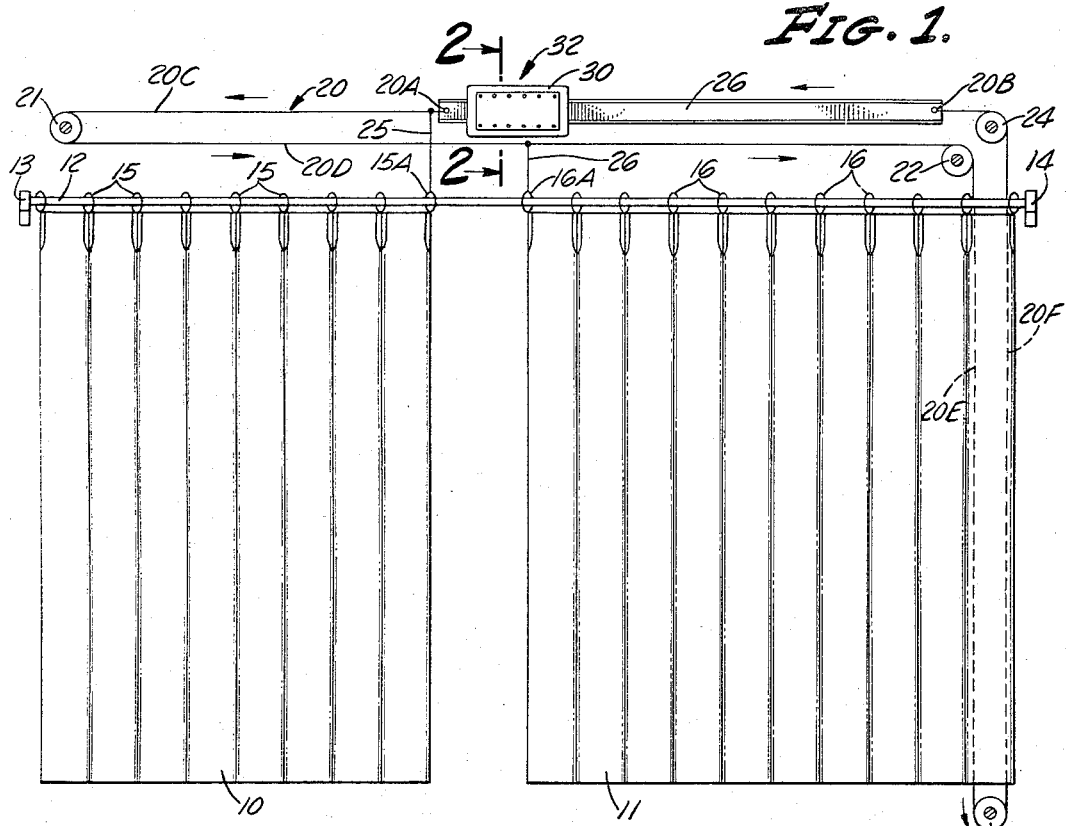
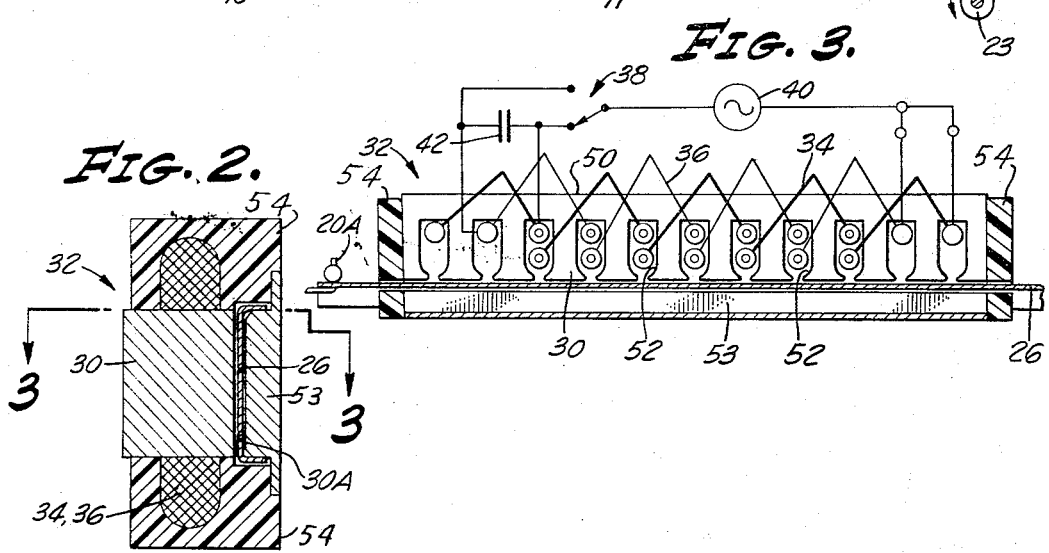
JOE W. VON BRIMER
INVENTOR.
BY Lyon & Lyon
ATTORNEYS

DRAPERY ACTUATOR
Joe W. von Brimer, Van Nuys, Calif., (% VB Research & Development, 1700 Westwood Blvd., Los Angeles, Calif. 90024)
Continuation of application Ser. No. 364,230, May 1, 1964. This application May 26, 1967, Ser. No. 641,707
4 Claims. (Cl. 160—331)

This application is a continuation of application Ser. No. 364,230, filed May 1, 1964, now abandoned.

The present invention relates to means and techniques useful in simultaneously moving two elements either closer to or further from each other, or for moving only one element, and is particularly useful in a system for opening and closing window curtains or drapes either when only one drape or two drapes are required to be moved.

Briefly, the arrangement as described herein involves a loop of flexible cord with a strip of non-magnetic but conductive material interposed in such loop to close such loop. This strip cooperates magnetically with a linear motor section of a linear actuator which has two windings selectively energizable for moving the strip and cord in opposite directions for either opening or closing drapes attached to such cord.

It is a general object of the present invention to provide a new arrangement for moving two elements closer to or further from each other.

A specific object of the present invention is to provide a new drapery actuator system characterized by its simplicity and inexpensiveness.

Another specific object of the present invention is to provide means and techniques whereby existing drape opening and closing arrangements may be modified for remote operation.

Another specific object of the present invention is to provide means and techniques whereby linear actuators may be used in opening and closing drapes.

Another specific object of the present invention is to provide a drapery actuating system which includes motor means and which may be operated manually in case of power failure or malfunctioning of the motor means.

Another object of the present invention is to provide a drapery system which incorporates motor means and which is actuatable either by energizing the motor means or manually without energizing the motor means.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 is generally a front plan view of a system embodying features of the present invention.

FIG. 2 is a section taken generally as indicated by lines 2—2 in FIG. 1.

FIG. 3 is generally a sectional view taken on line 3—3 of FIG. 2 with the actuator windings and their energizing circuit shown in schematic form.

Referring to FIG. 1, a pair of drapes, a left drape 10 and a right drape 11, is hung on a rod 12 having its ends supported on wall brackets 13 and 14 using conventional eyelets or drape hanger hooks 15, 16 which are slidable on rod 12.

A flexible cord 20 is trained to pass over a series of rollers or sheave members 21, 22, 23 and 24 mounted for rotation on the wall, the cord 20 having one of its ends 20A secured to one end of a strip 26 and its other end 20B secured to the other end of strip 26 after passing around the above mentioned rollers in that order, with the strip 26 thus forming part of a closed loop which includes the cord 20 and the strip 26.

This closed loop is defined by an upper horizontal section 20C (which includes the strip 26), a lower horizontal section 20D and two vertical sections 20E and 20F.

An intermediate portion of loop section 20C is attached to the inwardmost eyelet or hanger 15A of the series of hangers 15 by cord 25; and likewise, an intermediate portion of loop section 20D is attached to the inwardmost eyelet or hook 16A of the series of hangers 16 by cord 28.

The strip 26 of nonmagnetic but conductive material such as aluminum or copper is formed generally as a channel element, as seen in cross-section in FIG. 2, and is slidably mounted in a channeled opening or gap 30A extending through a magnetic drive structure 30 stationarily mounted on the wall to form part of a linear actuator having the general reference numeral 32. Regardless of whether or not this linear actuator 32 is energized, the drapes may be opened or closed manually by, for example, pulling up or correspondingly down on the cord section 20F which is normally hid behind an end portion of drape 11.

The linear actuator 32 includes two stationary windings 34 and 36 either one of which, as illustrated in FIG. 3, may be selectively energized to correspondingly open or close the drapes by operating the single-pole double-throw switch 38 which may be remotely located with its stationary contacts connected to correspondingly opposite ends of windings 34, 36 having its other ends each connected to one terminal of A.C. source 40, the other terminal of source 40 being connected to the movable contact of switch 38, and the first mentioned ends of windings 34 and 36 being interconnected by capacitor 42.

The linear actuator 32 is of the character described in my copending application Ser. No. 235,352, filed Nov. 5, 1962, and in the form illustrated includes a laminated magnetizable core member or stator 50 having winding slots 52. Into alternate ones of such slots are disposed the legs of a coil which comprises the winding 36; into the remaining slots are disposed the legs of a coil which comprises the winding 34 illustrated in FIGURE 3 by more heavy lines. These windings 34 and 36 when energized produce a magnetic flux which traverses the strip 26 and causes its relative movement. A return path may be provided for the flux by means of an elongated stationary laminated plate-like element 53 of magnetizable material which cooperates also with the core member or stator 50 in defining the channeled opening 30A. The windings 34 and 36, if desired, may be encased in an insulating or suitable plastic material 54 as illustrated.

It will be seen from FIG. 3 that the linear actuator 32 includes the elongated linear motor stator 50 and the strip 26, with a portion of such strip 26 passing adjacent the stator 50 to form a rectilinear moving element relative to the stator 50. As shown, the magnetic path return element 53 is positioned on the side of the strip 26 opposite the stator side to form the magnetic gap 30A.

It will be apparent from the teachings herein that the linear motor or actuator 32 and specifically the strip 26 may be interposed or attached to other cord sections than that section specifically shown in FIG. 1, and, for example, the strip 26 may be interposed or attached to the cord sections 20D, 20E or 20F.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. In a drapery actuating system including a plurality of pulleys and support means therefor, a cord carried on said pulleys, and means for attaching a drapery to said cord;
   an actuator comprising an elongated member of magnetic material, said member including slots, and electrical windings disposed in said slots;
   an elongated strip of nonmagnetic, electrically conductive material mounted adjacent said winding carrying member;
   and a magnetic path return element of magnetic material fastened to said winding carrying member on the opposite side of said strip from said windings to form a magnetic gap with said winding carrying member;
   said elongated strip being positioned within said magnetic gap such that when said windings are energized, one of said strips and said winding carrying member is movable relative to the other;
   and means connecting the movable member of said strip and said winding carrying member to said cord.

2. A drapery actuating system as set forth in claim 1 wherein said cord includes a pair of parallel horizontally extending sections and a pair of vertically extending interconnected sections,
   said drapery attaching means includes means attaching one of a pair of drapes to one of said horizontally extending sections and means attaching the other of said pair of drapes to the other of said horizontally extending sections for producing movement of said drapes upon movement of said cord.

3. A drapery actuating system as set forth in claim 1 wherein said winding carrying member is formed of laminated magnetic material and said elongated strip includes at least one flange extending perpendicular to its principal dimension and in the opposite direction from said windings.

4. A drapery actuating system as set forth in claim 3 wherein said elongated strip includes a pair of flanges extending perpendicular to its principal dimension, said flanges being so located relative to said magnetic path return element and said winding carrying member that magnetic material is physically adjacent to not more than one side of either of said flanges.

References Cited
UNITED STATES PATENTS

| | | | |
|---|---|---|---|
| 1,881,014 | 10/1932 | Ayers | 310—12 |
| 1,912,167 | 5/1933 | Anderson | 310—13 |
| 2,337,430 | 12/1943 | Trombetta | 310—13 |
| 2,798,194 | 7/1957 | Cantin | 160—331 X |
| 3,135,879 | 6/1964 | Baumann | 310—13 |

DAVID J. WILLIAMOWSKY, *Primary Examiner.*

P. C. KANNAN, *Assistant Examiner.*